United States Patent
Cheiky et al.

(10) Patent No.: US 6,541,160 B2
(45) Date of Patent: Apr. 1, 2003

(54) BATTERY SEPARATOR WITH SULFIDE-CONTAINING INORGANIC SALT

(75) Inventors: Michael Cheiky, Santa Barbara, CA (US); Wilson Hago, Ventura, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 182 days.

(21) Appl. No.: 09/839,320

(22) Filed: Apr. 19, 2001

(65) Prior Publication Data

US 2002/0182511 A1 Dec. 5, 2002

(51) Int. Cl.[7] ................................................ H01M 2/16
(52) U.S. Cl. ...................... 429/251; 429/247; 429/248; 429/232; 429/216; 429/229; 429/27; 429/28; 429/29
(58) Field of Search .................................. 429/247, 248, 429/251, 216, 232, 27, 28, 29, 229

(56) References Cited

U.S. PATENT DOCUMENTS

| | | | | |
|---|---|---|---|---|
| 4,078,127 A | * | 3/1978 | Megahad et al. | 429/206 |
| 4,273,840 A | | 6/1981 | Machi et al. | |
| 5,126,219 A | | 6/1992 | Howard et al. | |
| 5,830,601 A | * | 11/1998 | Lian et al. | 429/198 |
| 5,948,557 A | | 9/1999 | Ondeck et al. | |

\* cited by examiner

*Primary Examiner*—Carol Chaney
*Assistant Examiner*—Angela J Martin
(74) *Attorney, Agent, or Firm*—Marvin E. Jacobs

(57) ABSTRACT

A battery separator for use in a zinc-based battery containing sulfide ions is employed to minimize copper ion diffusion into the electrodes by placing a regenerated cellulose separator next to the copper-containing layer containing low solubility sulfide salts and precipitating the copper ions.

12 Claims, 1 Drawing Sheet

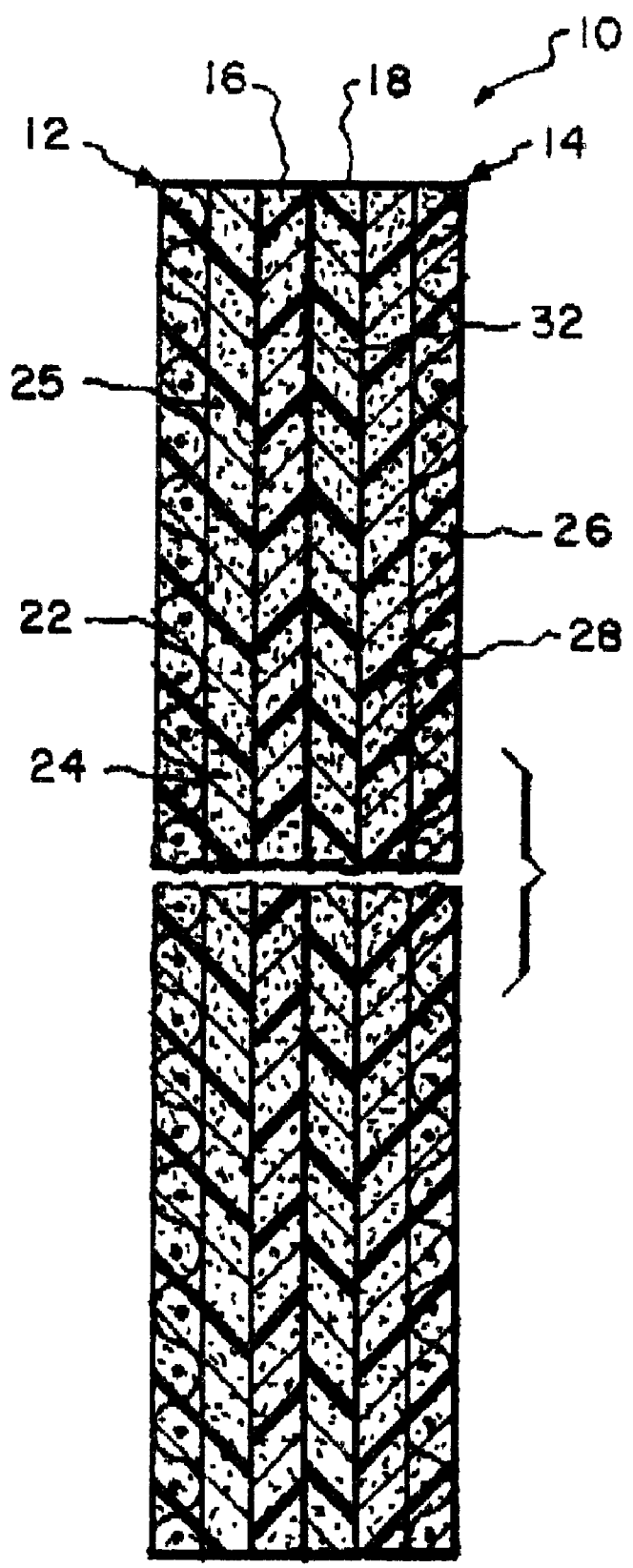

BATTERY SEPARATOR WITH SULFIDE-CONTAINING INORGANIC SALT

TECHNICAL FIELD

This invention relates to a battery separator for controlling copper ion diffusion in alkaline rechargeable batteries.

BACKGROUND OF THE INVENTION

A zinc based battery presents many challenges for the battery manufacturer. One of these challenges involves containing zincate diffusion within the battery. This is a particularly severe problem because zinc is extremely soluble in the strongly alkaline environments routinely used as the electrolyte in batteries. The presence of $KZn(OH)_x$ where x=1 to 3 presents a double-edged sword for the battery designer. The high solubility allows for rapid current spikes typically unattainable with other battery systems. On the other hand, this high solubility diffuses zinc ions in undesired locations within the battery, which upon re-plating leads to the well-known phenomenon of electrode shape change within zinc batteries. This shape change entails an agglommeration of the zinc towards the center of the battery with concomitant depletion from the edges.

Additionally, and more seriously, a problem arises from this high zinc mobility such that there is an accumulation of zinc dendrites within the separator as the battery cycles. Soluble zinc, driven by the electric fields of the battery, finds its way through the pores of the separator. A concentration gradient within the separator leads, upon zinc re-plating, to dendrite formation. The dendrites are small tree-like metal formations that are capable of ripping the separator and prompting a cell short.

One approach presented disclosed in concurrently filed co-pending application Ser. No. 09/839,324, entitled Homogenous Seperator, the disclosure of which is incorporated herein by reference, is to use separators impregnated with copper salts. These separators contribute to a substantial diminution of zinc migration from the anode to the cathode. This behavior is a result of the copper salts complexing the cellulose and thus preventing access of zinc to the pores of the cellulose. A problem with this approach is that copper tends to leach out from the separator at rates that affect battery performance. Leached-out copper tends to plate on zinc and modify the overvoltage potential. It also leaches out and re-plates on adjacent separators, affecting their ion transport properties.

STATEMENT OF THE PRIOR ART

Prior art in this area has focused on doping porous polyolefins with inorganic fillers. Thus, Machi et al in U.S. Pat. No. 4,273,840 disclose a multi-layer battery separator, wherein a metal ion binding substance is incorporated into a layer of synthetic resin that is sandwiched between two layers of synthetic resin. The first layer and third layers contain a monomer having a grafted hydrophilic group, and the middle layer with the metal ion-binding substance is fusion-bonded to the first and third layers. When the separator is to be used in zinc-silver oxide batteries, inorganic sulfides such as zinc sulfide, magnesium sulfide and calcium sulfide are used. All layers to be fused are preferably composed of polyethylene, polypropylene and other olefinic thermoplastic resins.

Ondeck et al in U.S. Pat. No. 5,948,557 disclose a battery separator made of a microporous material comprised of a linear polyolefin containing finely divided, substantially water-insoluble filler particles, such as zinc sulfide, distributed throughout the matrix. Microporous filaments and fibers are made wettable in U.S. Pat. No. 5,126,219 by incorporating hygroscopic fillers into the composition.

A sulfide additive is added to the alkaline electrolyte in U.S. Pat. No. 4,078,127. The purpose is to stabilize the divalent silver oxide (AgO) in the cathode.

STATEMENT OF THE INVENTION

The present invention provides a separator that diminishes the availability of soluble copper ions emanating from a zinc-resistant copper-doped, regenerated cellulose separator.

In accordance with the invention, a cellulose-based separator is embedded with an insoluble sulfide salt in a concentration range of 2 to 25% weight of said separator. The separator of the invention, when placed next to a copper-containing separator, minimizes copper ion diffusion into the electrodes by precipitation of said ions. The present invention relies on the dispersion of a sufficient amount of sulfide salt in the regenerated cellulose film as to substantially decrease the concentration of copper ions in the battery.

These and many other features and attendant advantages of the invention will become apparent as the invention becomes better understood by reference to the following detailed description when considered in conjunction with the accompanying drawings.

DETAILED DESCRIPTION OF THE DRAWING

The FIGURE is a cross-sectional view of a zinc alkaline battery containing a separator according to the invention.

DETAILED DESCRIPTION OF THE INVENTION

Referring now to the FIGURE, the battery 10 includes an anode 12, a cathode 14, a source of copper such as a copper salt containing separators 18 and a sulfide separator 16 according to the invention.

The anode 12 can comprise a high surface area, current conductor such as a silver screen 22 or expanded metal containing a layer 24 of anode paste containing particles 25 of Zn/ZnO. The cathode 14 can also include a silver screen 26 supporting a layer 28 of cathode paste such as silver/silver oxide particles 30 dispersed in a polymer matrix. The zinc dendrite controlling separator 18 releases copper ions into the alkaline electrolyte (KOH). The separator 16 in accordance with the invention contains a dispersion of particles 32 of low solubility metal sulfide. The sulfide ions react with the copper to form insoluble copper sulfides.

This invention concerns minimizing copper ion diffusion emanating from copper-doped cellulose-based separators. Cellulose having a degree of polymerization between 200 and 1200 is first dissolved and an insoluble sulfide salt, of solubility less than 1 mg/ml, is added to said solution in an amount from 2 to 25% weight of cellulose weight. The separator of the invention prevents leaching of copper from a zinc-resistant, copper-doped separator.

The novel aspect of the present invention is the use of an insoluble sulfide salt, embedded in a cellulose based separator, to control copper diffusion in separators. Cellulose remains an excellent material for use as a separator for alkaline batteries because of its excellent ion transport properties and low electrical impedance. It has been used since World War II in the form of cellophane as the preferred separator material for zinc-based batteries. Its low electrical resistance of 10 milliohm-in$^2$ has also led to its favor among battery manufacturers for use in zinc-based batteries, such as silver-zinc, zinc-nickel, and zinc manganese dioxide batteries. The separator of the present invention acts as a copper sink in an alkaline battery.

The encapsulation of the active salt is effected as follows. A solution of cellulose, with a degree of polymerization from 200 to 1200, in the form of, but not limited to, microcrystalline cellulose, cotton fiber, paper and microgranular cellulose, is dissolved using a variety of different solvents, including, but not limited to, LiCl/DMAC, trifluoroacetic acid and N-morpholine N-oxide. With LiCl/DMAC the applicable range is 3 to 8% by weight LiCl to DMAC and the applicable range for the percent weight solution of cellulose to solvent is 1 to 11%. The cellulose solution may be crosslinked by a variety of methods, in particular by reacting the cellulose with an alkyl dihalide. A hydrogen permeable, hydrophobic material, as disclosed in concurrently filed application Ser. No. 09/839,324 can be added at this point.

The hydrogen permeable material preferably forms hydrogen permeable domains within the regenerated cellulose film. The material is preferably soluble in a common solvent to cellulose so that the domains form on casting. Suitable hydrogen permeable materials are cellulose ethers in which the ether group contains 2 to 8 carbon atoms and is present in the separator film in an amount from 10 to 60 parts by weight to 100 parts of cellulose.

A sulfide salt, with solubility less than 1 mg/ml, is added to the solution as suspension. Salts with the necessary requirements include, but are not limited to, indium sulfide, bismuth sulfide, and zinc sulfide, tin sulfide, lead sulfide, cadmium sulfide, and silver sulfide. The amount of salt needed is 2 to 25% by weight of starting weight of cellulose.

The resulting mixture is then cast via conventional methods. These methods are known to those skilled in the art of membrane fabrication. They include extrusion of the solution onto a conveyor belt, casting onto a glass plate with a casting knife or casting onto a well-leveled glass plate.

After casting, the resulting solution is coagulated with conventional techniques, preferably using water as the coagulating agent. Coagulation may be attained either by exposure to ambient moisture or by direct application of a water stream to the resulting solution. The coagulated cellulose material is then washed to remove the solvent and the LiCl salt. The sulfide salt, because of its relative insolubility, will remain in the gel. It is possible to employ alcohols mixed with water, but it is preferable that they be kept below 50% volume ratio.

After thorough washing of the resulting gel, the gel may be dried by any conventional methods, including air-drying, press-drying, or vacuum-drying. Separators built in the manner described above were tested for ability to contain copper migration in the following manner. A cavity with two compartments of 20 ml volume each has three separators dividing the two compartments. The two compartments are each filled with 20 ml of 50% potassium hydroxide by weight. The middle separator is impregnated with 150 mg Cu(OH)2 per film. The left separator does not have any salt at all, while the other separator has impregnated sulfide salt as in the above example. The presence of copper in the solution to the left of the left separator and to the right of the right separator is ascertained after 24 hours via atomic absorption spectroscopy. Results reported are in ppm of Cu.

TABLE 1

| FILM TYPE | ppm Cu-undoped side | ppm Cu-sulfide side |
|---|---|---|
| Cellulose A-In$_2$S$_3$ | 3.0 | 1.2 |
| Cellulose B-In$_2$S$_3$ | 1.9 | 0.8 |
| Cellulose A-Bi$_2$S$_3$ | 2.7 | 0.8 |
| Cellulose A-ZnS | 3.9 | 0.8 |

It is to be realized that only preferred embodiments of the invention have been described and that numerous substitutions, modifications and alterations are permissible without departing from the spirit and scope of the invention as defined in the following claims.

What is claimed is:

1. A separator for use in a zinc alkaline battery containing copper ions dissolved in an alkaline electrolyte comprising a film of regenerated cellulose containing a dispersion of sulfide particles.

2. A separator according to claim 1 in which a sulfide salt has a solubility of less than 1 mg/ml.

3. A separator according to claim 2 in which the sulfide particles are present in an amount from 2% to 25% by weight.

4. A separator according to claim 3 in which the sulfide salt is selected from the group consisting of indium sulfide, bismuth sulfide, zinc sulfide, tin sulfide, lead sulfide, cadmium sulfide and silver sulfide.

5. A separator according to claim 2 in which the cellulose has a degree of polymerization from 200 to 1200.

6. A separator according to claim 5 in which the cellulose is selected from the group consisting of microcrystalline cellulose, cotton fiber, paper and microgranular cellulose.

7. A separator according to claim 5 in which the film contains 10 to 60 parts by weight of 100 parts cellulose of hydrogen permeable material.

8. A separator according to claim 7 in which the material forms hydrogen permeable domains within the film.

9. A separator according to claim 8 in which the material is a cellulose ether in which the ether groups contain 2 to 8 carbon atoms.

10. A separator according to claim 9 in which the material is ethyl cellulose.

11. A zinc alkaline battery containing:

a zinc containing anode a metal containing cathode an alkaline electrolyte containing a source of copper ions; and a regenerated cellulose separator dispersed between the anode and cathode containing a low solubility sulfide for controlling the concentrations of copper ions in the electrolyte.

12. A battery according to claim 11 in which the source of copper ions is a regenerated cellulose separator, containing a dispersion of a copper salt.

\* \* \* \* \*